United States Patent
Chiba (10) Patent No.: US 11,624,010 B2
(45) Date of Patent: Apr. 11, 2023

(54) METHOD OF PRODUCING ADHESIVE RESIN

(71) Applicant: ZEON CORPORATION, Tokyo (JP)

(72) Inventor: Daido Chiba, Tokyo (JP)

(73) Assignee: ZEON CORPORATION, Tokyo (JP)

(*) Notice: Subject to any disclaimer, the term of this patent is extended or adjusted under 35 U.S.C. 154(b) by 405 days.

(21) Appl. No.: 17/052,805

(22) PCT Filed: May 15, 2019

(86) PCT No.: PCT/JP2019/019262
§ 371 (c)(1),
(2) Date: Nov. 4, 2020

(87) PCT Pub. No.: WO2019/225424
PCT Pub. Date: Nov. 28, 2019

(65) Prior Publication Data
US 2021/0238460 A1    Aug. 5, 2021

(30) Foreign Application Priority Data

May 22, 2018  (JP) .............................. JP2018-098087

(51) Int. Cl.
| | | |
|---|---|---|
| *C09J 153/02* | (2006.01) | |
| *C08K 5/14* | (2006.01) | |
| *B29B 7/00* | (2006.01) | |
| *B29B 7/14* | (2006.01) | |
| *B29B 7/20* | (2006.01) | |
| *B29B 7/24* | (2006.01) | |
| *B29B 7/82* | (2006.01) | |
| *B29B 7/88* | (2006.01) | |
| *B29B 9/06* | (2006.01) | |
| *C08K 5/3475* | (2006.01) | |
| *C08K 5/5419* | (2006.01) | |

(52) U.S. Cl.
CPC .............. *C09J 153/02* (2013.01); *B29B 7/005* (2013.01); *B29B 7/14* (2013.01); *B29B 7/20* (2013.01); *B29B 7/242* (2013.01); *B29B 7/82* (2013.01); *B29B 7/88* (2013.01); *B29B 9/065* (2013.01); *C08K 5/14* (2013.01); *C08K 5/3475* (2013.01); *C08K 5/5419* (2013.01)

(58) Field of Classification Search
CPC ..... C08F 257/02; C09J 153/025; C09J 153/02
See application file for complete search history.

(56) References Cited

U.S. PATENT DOCUMENTS

| | | | |
|---|---|---|---|
| 2013/0008506 A1 | 1/2013 | Tanahashi et al. | |
| 2013/0244367 A1* | 9/2013 | Kohara | ................... B32B 27/18 |
| | | | 524/110 |
| 2016/0304650 A1 | 10/2016 | Read et al. | |
| 2020/0248048 A1* | 8/2020 | Kurokawa | ............ C08F 285/00 |

FOREIGN PATENT DOCUMENTS

| | | |
|---|---|---|
| EP | 2623526 A1 | 8/2013 |
| EP | 3369782 A1 | 9/2018 |
| JP | 2017501280 A | 1/2017 |
| WO | 2011096389 A1 | 8/2011 |
| WO | 2012043708 A1 | 4/2012 |
| WO | 2017098889 A1 | 6/2017 |

OTHER PUBLICATIONS

Nov. 24, 2020, International Preliminary Report on Patentability issued in the International Patent Application No. PCT/JP2019/019262.

* cited by examiner

*Primary Examiner* — Jeffrey C Mullis
(74) *Attorney, Agent, or Firm* — Kenja IP Law PC (57) ABSTRACT

A method of producing an adhesive resin includes: a heating and kneading step of kneading a mixture containing a ring structure-containing hydrocarbon resin, an adhesive functional group-containing compound, and a peroxide while heating the mixture to obtain a heated and kneaded product; and a cooling and kneading step, performed in succession to the heating and kneading step, of kneading the heated and kneaded product while cooling the heated and kneaded product to obtain a cooled and kneaded product. The adhesive resin has a yellowness index (Yi) of 3.0 or less when 0.8 parts by mass of 2-(5-chloro-2-benzotriazolyl)-6-tert-butyl-p-cresol is added to 100 parts by mass of the adhesive resin.

7 Claims, 2 Drawing Sheets

METHOD OF PRODUCING ADHESIVE RESIN

TECHNICAL FIELD

The present disclosure relates to a method of producing an adhesive resin.

BACKGROUND

Patent Literature (PTL) 1 proposes, as a method of producing an adhesive resin, a method in which a hot melt composition is produced as a seal material by modifying a thermoplastic polymer with a silane coupling agent in the presence of an organic peroxide.

Moreover, PTL 2 proposes, as a method of forming a functionalized low-viscosity ethylene-based polymer using a peroxide, a method in which a composition containing an ethylene-based polymer, at least one polar compound, and at least one peroxide is heat treated inside at least one extruder including at least one barrel to form a polymer melt. A peroxide having a specific half-life is used as the peroxide.

CITATION LIST

Patent Literature

PTL 1: WO2017/098889A1
PTL 2: JP2017-501280A

SUMMARY

Technical Problem

In a situation in which a peroxide remains in an adhesive resin that has been obtained through a reaction in the presence of the peroxide, radicals may be generated through decomposition of the peroxide. Not only do these radicals cause decomposition and degradation of the adhesive resin, but are also problematic in terms that they may react with additives that are subsequently added to the adhesive resin, thereby reducing the original performance of the additives and the adhesive resin, and may cause coloring of the adhesive resin.

One method that may be considered for preventing the presence of residual peroxide is heating to cause decomposition of the peroxide into carbon dioxide gas and water. However, a long residence time inside a device that performs heating is required in order to cause sufficient decomposition of the peroxide, which necessitates the use of a large device. Moreover, unnecessary heating of a peroxide may also generate radicals and cause decomposition and cross-linking of an adhesive resin, resulting in problems such as gel formation in the adhesive resin and brown discoloration. Furthermore, even in a situation in which a peroxide is heated in a temperature region in which gel formation does not occur in an adhesive resin, when the molten adhesive resin is discharged and is cut for pelletization after solidifying, there is a problem that if the temperature of the adhesive resin is excessively high, melt viscosity of the adhesive resin is low, cooling and solidification cannot keep up, and pelletization cannot be performed.

Note that the method described in PTL 2 involves addition of a polar compound to a low-viscosity ethylene-based polymer, which is a soft resin, in order to impart a function of adhesiveness. Therefore, according to the method in PTL 2, even when the obtained polymer is cut for pelletization, the cut pellets soon become stuck together, and bridging and blocking occur, which, in reality, makes pelletization impossible.

Moreover, ethylene-based polymers such as polyethylene have poor transparency, and thus are typically used when transparency is not required, such as a coating material of wiring cables or an adhesive layer with metal, rather than in applications in which high transparency is required. Note that gel formation and brown discoloration are tolerable in such uses. On the other hand, in the case of a high-transparency resin including a ring structure, for example, such gel formation and brown discoloration are important factors related to quality. Consequently, there is demand for a production method that inhibits decomposition of a resin and does not cause gel formation or brown discoloration.

Accordingly, an object of the present disclosure is to provide a method of producing an adhesive resin that inhibits changes over time of the adhesive resin, such as decomposition and degradation, and the occurrence of gel formation, while also enabling efficient pelletization.

Solution to Problem

The inventor conducted diligent studies with the aim of achieving the object set forth above. The inventor reached a new finding that by kneading a mixture containing a ring structure-containing hydrocarbon resin, an adhesive functional group-containing compound, and a peroxide while heating the mixture, and then, in succession thereto, kneading the mixture while cooling the mixture, it is possible to inhibit the presence of residual peroxide in an obtained adhesive resin, and, as a result, to inhibit changes over time, such as decomposition and degradation, and gel formation, while also enabling efficient pelletization. In this manner, the inventor completed the present disclosure.

Specifically, the present disclosure aims to advantageously solve the problems set forth above, and a presently disclosed method of producing an adhesive resin comprises: a heating and kneading step of kneading a mixture containing a ring structure-containing hydrocarbon resin, an adhesive functional group-containing compound, and a peroxide while heating the mixture to obtain a heated and kneaded product; and a cooling and kneading step, performed in succession to the heating and kneading step, of kneading the heated and kneaded product while cooling the heated and kneaded product to obtain a cooled and kneaded product, wherein the adhesive resin has a yellowness index (Yi) of 3.0 or less when 0.8 parts by mass of 2-(5-chloro-2-benzotriazolyl)-6-tert-butyl-p-cresol is added to 100 parts by mass of the adhesive resin. By performing a heating and kneading step and then a cooling and kneading step, in succession thereto, and by an adhesive resin having a yellowness index (Yi) of 3.0 or less when 0.8 parts by mass of 2-(5-chloro-2-benzotriazolyl)-6-tert-butyl-p-cresol is added to 100 parts by mass of the adhesive resin in this manner, it is possible to obtain an adhesive resin that can be efficiently pelletized while also inhibiting the presence of residual peroxide and inhibiting changes over time of the adhesive resin, such as decomposition and degradation, and gel formation.

Note that the "yellowness index (Yi)" referred to in the present disclosure can be measured according to a method described in the EXAMPLES section of the present specification.

In the presently disclosed method of producing an adhesive resin, it is preferable that the heating and kneading step is performed by a first kneading device and the cooling and kneading step is performed by a second kneading device.

Performing the heating and kneading step and the cooling and kneading step using different kneading devices makes it easy to make adjustments in each of the kneading steps and, as a result, enables efficient production of an adhesive resin.

In the presently disclosed method of producing an adhesive resin, kneading is preferably performed until content of the peroxide in the mixture is less than 1 ppm in the heating and kneading step. By performing kneading until the content of the peroxide in the mixture is less than 1 ppm, the presence of residual peroxide in the obtained adhesive resin can be sufficiently inhibited.

In the presently disclosed method of producing an adhesive resin, kneading is preferably performed until melt viscosity of the heated and kneaded product at a shear rate of not less than 1 mm/min and not more than 10 mm/min is 20 Pa·s or more in the cooling and kneading step. By performing kneading until the melt viscosity of the heated and kneaded product is at least the lower limit set forth above in the cooling and kneading step, handling of the resultant cooled and kneaded product is facilitated.

Note that the "melt viscosity" referred to in the present disclosure can be measured according to a method described in the EXAMPLES section of the present specification.

In the presently disclosed method of producing an adhesive resin, the ring structure-containing hydrocarbon resin is preferably a hydrogenated block copolymer [D] obtained through hydrogenation of a block copolymer [C] including at least two polymer blocks [A] having a structural unit derived from an aromatic vinyl compound as a main component and at least one polymer block [B] having a structural unit derived from a conjugated diene compound as a main component. By using such a hydrogenated block copolymer [D] as the ring structure-containing hydrocarbon resin, an adhesive resin can be efficiently produced, and the adhesive resin can be easily pelletized.

In the presently disclosed method of producing an adhesive resin, the hydrogenated block copolymer [D] is preferably a product in which 90% or more of aromatic ring carbon-carbon unsaturated bonds in the block copolymer [C] that are derived from the aromatic vinyl compound and main chain and side chain carbon-carbon unsaturated bonds in the block copolymer [C] that are derived from the conjugated diene compound have been hydrogenated. By using such a hydrogenated block copolymer [D] as the ring structure-containing hydrocarbon resin, an adhesive resin can be more efficiently produced.

In the presently disclosed method of producing an adhesive resin, the adhesive functional group-containing compound is preferably at least one selected from the group consisting of a silane coupling agent, an unsaturated carboxylic acid anhydride, and a glycidyl ether. By using at least one selected from the group consisting of a silane coupling agent, an unsaturated carboxylic acid anhydride, and a glycidyl ether as the adhesive functional group-containing compound, an adhesive resin can be even more efficiently produced.

Advantageous Effect

Through the presently disclosed production method, it is possible to provide an adhesive resin that can be efficiently pelletized while also inhibiting changes over time, such as decomposition and degradation, and gel formation by inhibiting the presence of residual peroxide in the adhesive resin.

BRIEF DESCRIPTION OF THE DRAWINGS

In the accompanying drawings.

DETAILED DESCRIPTION

The following provides a detailed description of embodiments of the present disclosure.

The presently disclosed method of producing an adhesive resin can be used in production of an adhesive resin that is obtained by reacting a ring structure-containing hydrocarbon resin and an adhesive functional group-containing compound using a peroxide. Changes over time, such as decomposition and degradation, and gel formation in an adhesive resin obtained through the presently disclosed production method are inhibited due to the presence of residual peroxide being inhibited, and efficient pelletization of the adhesive resin is possible due to the adhesive resin being cooled. Moreover, an adhesive resin obtained through the presently disclosed production method can sufficiently display the original performance thereof without being easily affected by subsequently added additives due to the presence of residual peroxide being inhibited. Furthermore, mechanical strength is improved through inhibition of gel formation in the adhesive resin. For these reasons, an adhesive resin obtained through the presently disclosed production method can be used in various applications.

(Method of Producing Adhesive Resin)

The presently disclosed method of producing an adhesive resin includes a heating and kneading step of kneading a mixture containing a ring structure-containing hydrocarbon resin, an adhesive functional group-containing compound, and a peroxide while heating the mixture to obtain a heated and kneaded product and a cooling and kneading step, performed in succession to the heating and kneading step, of kneading the heated and kneaded product while cooling the heated and kneaded product to obtain a cooled and kneaded product, and can optionally include other steps described further below.

<Adhesive Resin>
[Yellowness Index (Yi)]

An adhesive resin obtained through the presently disclosed production method has a yellowness index (Yi) of 3.0 or less when 0.8 parts by mass of 2-(5-chloro-2-benzotriazolyl)-6-tert-butyl-p-cresol is added to 100 parts by mass of the adhesive resin. Note that the adhesive resin to which 2-(5-chloro-2-benzotriazolyl)-6-tert-butyl-p-cresol has been added is preferably heated and kneaded at a temperature that is not lower than the temperature at which the peroxide used in the presently disclosed production method decomposes and that is not lower than the melting point of 2-(5-chloro-2-benzotriazolyl)-6-tert-butyl-p-cresol. In a situation in which the adhesive resin to which 2-(5-chloro-2-benzotriazolyl)-6-tert-butyl-p-cresol has been added is heated and kneaded at a lower temperature than the decomposition temperature of the peroxide and/or a lower temperature than the melting point of 2-(5-chloro-2-benzotriazolyl)-6-tert-butyl-p-cresol, an increase of the yellowness index may not occur due to insufficient progress of a reaction of residual peroxide and 2-(5-chloro-2-benzotriazolyl)-6-tert-butyl-p-cresol, and, as a result, it may not be possible to confirm the presence of residual peroxide and the influence on the obtained adhesive resin of additives that are added to the adhesive resin.

Note that the yellowness index of the adhesive resin can be measured using a spectrophotometer.

Also note that 2-(5-chloro-2-benzotriazolyl)-6-tert-butyl-p-cresol is a commonly known compound. The 2-(5-chloro-2-benzotriazolyl)-6-tert-butyl-p-cresol may be a commercially available product or may be produced by a commonly known method. The 2-(5-chloro-2-benzotriazolyl)-6-tert-butyl-p-cresol can be added to the adhesive resin by a known method without any specific limitations.

<Heating and Kneading Step>

In the heating and kneading step of the presently disclosed method of producing an adhesive resin, a mixture containing a ring structure-containing hydrocarbon resin, an adhesive functional group-containing compound, and a peroxide is kneaded while being heated to obtain a heated and kneaded product.

[Ring Structure-Containing Hydrocarbon Resin]

The ring structure-containing hydrocarbon resin referred to in the present disclosure is a hydrocarbon resin that includes an aromatic ring and/or an alicyclic structure in a main chain or side chain thereof. In particular, the ring structure-containing hydrocarbon resin is preferably a hydrocarbon resin that includes an aromatic ring and/or an alicyclic structure in a side chain. This is because heat resistance of the obtained adhesive resin is improved by using a hydrocarbon resin that includes an aromatic ring and/or an alicyclic structure in a side chain as a result of the glass-transition temperature of a hydrocarbon resin including an aromatic ring and/or an alicyclic structure in a side chain being high compared to that of a hydrocarbon resin including an aromatic ring and/or an alicyclic structure in a main chain.

The ring structure included in the ring structure-containing hydrocarbon resin may be an aromatic ring and/or an alicyclic structure, but is preferably an alicyclic structure, and more preferably a cycloalkane.

The number of carbons included in the ring structure is preferably not less than 3 and not more than 10, and more preferably 6.

The ring structure-containing hydrocarbon resin may, for example, be (i) a block copolymer [C] including at least two polymer blocks [A] having a structural unit derived from an aromatic vinyl compound as a main component and at least one polymer block [B] having a structural unit derived from a conjugated diene compound as a main component, or (ii) a hydrogenated block copolymer [D] obtained through hydrogenation of the block copolymer [C]. The block copolymer [C] is preferable because the softening temperature and rigidity thereof can be controlled by altering the molecular weights and proportions of the polymer blocks and because an increase of the yellowness index due to thermal degradation of the resin can easily be inhibited by designing the block copolymer [C] to have a melting temperature suitable for modification or by improving heat resistance. The hydrogenated block copolymer [D] obtained through hydrogenation of the block copolymer [C] is more preferable because heat resistance is further improved, and an increase of the yellowness index due to thermal degradation of the resin and ultraviolet light absorption can be inhibited.

Note that in the present disclosure, "having a structural unit derived from an aromatic vinyl compound as a main component" means "including more than 50 mass % of a structural unit derived from an aromatic vinyl compound", whereas "having a structural unit derived from a conjugated diene compound as a main component" means "including more than 50 mass % of a structural unit derived from a conjugated diene compound".

The aromatic vinyl compound is not specifically limited so long as it is an aromatic hydrocarbon that includes a vinyl group. Examples of vinyl group-containing aromatic hydrocarbons include styrene, o-methylstyrene, p-methylstyrene, p-tert-butylstyrene, 1,3-dimethylstyrene, α-methylstyrene, vinylnaphthalene, and vinylanthracene.

The conjugated diene compound is not specifically limited so long as it is a diolefin compound that includes at least one pair of conjugated double bonds. The conjugated diene compound is preferably a chain conjugated diene (linear conjugated diene or branched conjugated diene). Examples of chain conjugated dienes include 1,3-butadiene, 2-methyl-1,3-butadiene (isoprene), 2,3-dimethyl-1,3-butadiene, 1,3-pentadiene, and 1,3-hexadiene.

From a viewpoint of enabling efficient production of an adhesive resin, the ring structure-containing hydrocarbon resin is preferably a hydrogenated block copolymer [D] obtained through hydrogenation of a block copolymer [C] including at least two polymer blocks [A] having a structural unit derived from an aromatic vinyl compound as a main component and at least one polymer block [B] having a structural unit derived from a conjugated diene compound as a main component.

~Polymer Block [A]~

The proportional content of a structural unit derived from an aromatic vinyl compound in a polymer block [A] when all repeating units in the polymer block [A] are taken to be 100 mass % is preferably 80 mass % or more, more preferably 90 mass % or more, even more preferably 95 mass % or more, and particularly preferably 100 mass %. When the proportional content of a structural unit derived from an aromatic vinyl compound in the polymer block [A] is 80 mass % or more, a microphase separation domain originating from the polymer block [A] in the hydrogenated block copolymer [D] can be maintained, and heat resistance of the polymer block [A] and tensile strength can be maintained.

Note that the polymer block [A] may include a structural unit that is not a structural unit derived from an aromatic vinyl compound as another structural unit. Examples of such other structural units include chain conjugated diene structural units. A component that does not include a polar group is preferable as a component that can form another structural unit from a viewpoint of reducing hygroscopicity, and examples thereof include chain olefins such as ethylene, propylene, 1-butene, 1-pentene, 1-hexene, 1-heptene, 1-octene, 1-nonene, 1-decene, 1-dodecene, 1-eicosene, 4-methyl-1-pentene, and 4,6-dimethyl-1-heptene; and cycloolefins such as vinylcyclohexane.

Note that in a case in which the block copolymer [C] includes a plurality of polymer blocks [A], the compositions of structures forming the plurality of polymer blocks [A] may be the same or different.

~Polymer Block [B]~

The proportional content of a structural unit derived from a conjugated diene compound in a polymer block [B] when all repeating units in the polymer block [B] are taken to be 100 mass % is preferably 60 mass % or more, more preferably 80 mass % or more, even more preferably 90 mass % or more, and particularly preferably 100 mass %. When the proportional content of a structural unit derived from a conjugated diene compound in the polymer block [B] is 60 mass % or more, a glass-transition temperature (Tg) originating from the polymer block [B] in the block copolymer [C] can be obtained, and low-temperature impact strength can be maintained.

Note that the polymer block [B] may include a structural unit that is not a structural unit derived from a conjugated diene compound as another structural unit. Examples of such other structural units include aromatic vinyl structural units. Moreover, another structural unit may be formed from a chain olefin or cycloolefin such as previously described in the "Polymer block [A]" section.

Note that in a case in which the block copolymer [C] includes a plurality of polymer blocks [B], the compositions of structures forming the plurality of polymer blocks [B] may be the same or different.

~Block Copolymer [C]~

The block copolymer [C] is a precursor to the hydrogenated block copolymer [D] and is a macromolecule including at least two polymer blocks [A] and at least one polymer block [B].

The number of polymer blocks [A] in the block copolymer [C] is normally 5 or fewer, preferably 4 or fewer, more preferably 3 or fewer, and even more preferably 2.

The number of polymer blocks [B] in the block copolymer [C] is normally 4 or fewer, preferably 3 or fewer, more preferably 2 or fewer, and even more preferably 1.

~wA:wB~

When the weight fraction of the entire block copolymer [C] constituted by all aromatic vinyl compound-derived structural units in the block copolymer [C] is taken to be wA and the weight fraction of the entire block copolymer [C] constituted by all conjugated diene compound-derived structural units in the block copolymer [C] is taken to be wB, a ratio of wA and wB (wA:wB) is preferably 20:80 to 60:40, more preferably 25:75 to 60:40, and even more preferably 40:60 to 60:40.

When wA is too large, impact resistance at low temperatures of the hydrogenated block copolymer [D] obtained from the block copolymer [C] may decrease. On the other hand, when wA is too small, rigidity of the hydrogenated block copolymer [D] obtained from the block copolymer [C] may decrease.

Note that with regards to the "ratio of wA and wB (wA:wB)", the mass fraction constituted by each structural unit can be calculated from the number of parts of aromatic vinyl compound-derived structural units and conjugated diene compound-derived structural units used in polymerization of the block copolymer [C] in a production process of the block copolymer [C] and the polymerization conversion rate to polymer of used structural units at a stage corresponding to the end of polymerization of each block of the block copolymer [C] as measured by gas chromatography (GC).

The form of blocks of the block copolymer [C] may be that of chain-type blocks or radial-type blocks, but chain-type blocks are preferable in terms of having excellent mechanical strength. The block copolymer [C] preferably has a structure in which polymer blocks [A] are bonded to both ends of a polymer block [B] (i.e., a structure arranged in an order of A-B-A) at at least one location.

Particularly preferable forms of the block copolymer [C] include a triblock copolymer (A-B-A) in which polymer blocks [A] are bonded to both ends of a polymer block [B] and a pentablock copolymer (A-B-A-B-A) in which polymer blocks [B] are bonded to both ends of a polymer block [A] and then polymer blocks [A] are bonded to the other ends of the two polymer blocks [B], with a triblock copolymer (A-B-A) being most preferable.

The block copolymer [C] may be a styrene-butadiene-styrene block copolymer, a styrene-isoprene-styrene block copolymer, or the like, for example, with a styrene-isoprene-styrene block copolymer being preferable.

The hydrogenation method of unsaturated bonds of the block copolymer [C], the form of reaction, and so forth are not specifically limited and can be in accordance with commonly known methods.

For example, a commonly known hydrogenation method such as described in JP2015-78090A, for example, can be adopted as a method of selectively hydrogenating main chain and side chain carbon-carbon unsaturated bonds of the block copolymer [C] that are derived from a conjugated diene compound.

Moreover, a method such as described in WO2011/096389A1 or WO2012/043708A1, for example, can be adopted as a method of hydrogenating main chain and side chain carbon-carbon unsaturated bonds of the block copolymer [C] that are derived from a conjugated diene compound and aromatic ring carbon-carbon unsaturated bonds of the block copolymer [C] that are derived from an aromatic vinyl compound.

After completion of the hydrogenation reaction, the hydrogenated block copolymer [D] can be collected by removing a hydrogenation catalyst, or a hydrogenation catalyst and a polymerization catalyst from the reaction solution, and then removing a solvent from the resultant solution.

~Hydrogenated Block Copolymer [D]~

The hydrogenated block copolymer [D] can be obtained by hydrogenating unsaturated bonds in the block copolymer [C] set forth above (for example, inclusive of main chain and side chain carbon-carbon unsaturated bonds and of aromatic ring carbon-carbon unsaturated bonds).

—Percentage Hydrogenation—

The percentage hydrogenation of the hydrogenated block copolymer [D] obtained through hydrogenation is preferably 90 mol % or more, more preferably 97 mol % or more, and even more preferably 99 mol % or more. Note that the "percentage hydrogenation" referred to in the present disclosure is the proportion of hydrogenated unsaturated bonds among all unsaturated bonds included in a copolymer. The percentage hydrogenation can be determined through $^1$H-NMR measurement of the block copolymer [C] and the hydrogenated block copolymer [D].

In a case in which only main chain and side chain carbon-carbon unsaturated bonds in the block copolymer [C] that are derived from a conjugated diene compound are selectively hydrogenated, the percentage hydrogenation of the main chain and side chain carbon-carbon unsaturated bonds is normally 95% or more, preferably 97% or more, and more preferably 99% or more.

Note that "hydrogenation of main chain and side chain carbon-carbon unsaturated bonds" refers to "hydrogenation of double bonds in the block copolymer [C] that are derived from a conjugated diene compound".

Moreover, in a case in which aromatic ring carbon-carbon unsaturated bonds in the block copolymer [C] that are derived from an aromatic vinyl compound and main chain and side chain carbon-carbon unsaturated bonds in the block copolymer [C] that are derived from a conjugated diene compound are hydrogenated, the percentage hydrogenation is preferably 90% or more, more preferably 97% or more, and even more preferably 99% or more of all carbon-carbon unsaturated bonds. When the percentage hydrogenation is 90% or more, heat resistance and transparency can be further improved.

Herein, the hydrogenated block copolymer [D] is preferably a product obtained through selective hydrogenation of main chain and side chain carbon-carbon unsaturated bonds in the block copolymer [C] that are derived from a conjugated diene compound or a product obtained through hydrogenation of 95% or more of aromatic ring carbon-carbon unsaturated bonds in the block copolymer [C] that are derived from an aromatic vinyl compound and main chain and side chain carbon-carbon unsaturated bonds in the block copolymer [C] that are derived from a conjugated diene compound.

The hydrogenated block copolymer [D] may be a hydrogenated styrene-isoprene-styrene block copolymer, a styrene-ethylene-butylene-styrene block copolymer, a hydrogenated styrene-ethylene-propylene-styrene block copolymer, or the like, for example. One of these block copolymers may be used individually, or two or more of these block copolymers may be used in combination.

—Weight-Average Molecular Weight—

The weight-average molecular weight (Mw) of the ring structure-containing hydrocarbon resin used in the presently disclosed production method is preferably 7,000 or more, more preferably 10,000 or more, and even more preferably 12,000 or more, and is preferably 190,000 or less, more preferably 150,000 or less, and even more preferably 100,000 or less. When the weight-average molecular weight of the ring structure-containing hydrocarbon resin is not less than any of the lower limits set forth above, aggregation of the ring structure-containing hydrocarbon resin can be inhibited. On the other hand, when the weight-average molecular weight of the ring structure-containing hydrocarbon resin is not more than any of the upper limits set forth above, kneading can be efficiently performed in the heating and kneading step.

—Molecular Weight Distribution—

The molecular weight distribution (Mw/Mn) of the ring structure-containing hydrocarbon resin is preferably 7 or less, preferably 6 or less, and more preferably 5 or less. When the molecular weight distribution is 7 or less, mechanical strength can be improved.

Note that the weight-average molecular weight and the number-average molecular weight of the ring structure-containing hydrocarbon resin are measured by gel permeation chromatography (GPC).

—Proportional Content of Ring Structure-Containing Hydrocarbon Resin—

The proportional content of the ring structure-containing hydrocarbon resin in the mixture that is kneaded in the heating and kneading step is preferably 50 mass % or more. When the proportional content of the ring structure-containing hydrocarbon resin is not less than the lower limit set forth above, stability over time and adhesive strength of the obtained adhesive resin improve.

[Adhesive Functional Group-Containing Compound]

The adhesive functional group-containing compound used in the presently disclosed production method is a compound having, in the structure thereof, a functional group that displays affinity or reactivity with respect to an adherend substrate. A functional group displaying affinity is a functional group with which adhesiveness is obtained through electrostatic interaction with an adherend substrate and specific examples thereof include a hydroxyl group, a carboxyl group, and an amino group. A functional group displaying reactivity is a functional group with which adhesiveness is obtained through bonding via an ionic bond or a covalent bond that results from structural change accompanying a chemical reaction with a reaction site present at the surface of an adherend substrate and specific examples thereof include an isocyanate group, an epoxy group, a silanol group, an alkoxysilyl group, and an acryloyl group.

The adhesive functional group-containing compound may be a cyanoacrylate, a diisocyanate, a silane coupling agent, an unsaturated carboxylic acid anhydride, a glycidyl ether, or the like, for example. Of these examples, the adhesive functional group-containing compound is preferably at least one selected from the group consisting of a silane coupling agent, an unsaturated carboxylic acid anhydride, and a glycidyl ether.

Examples of silane coupling agents that can be used include vinylmethoxysilane, vinyltrimethoxysilane, vinyltriethoxysilane, vinyltriisopropoxysilane, vinyltris(isobutoxy)silane, vinylmethyldimethoxysilane, vinyltris(2-methoxyethoxy)silane, vinyltris(methylethylketoxime)silane, vinyltris(n-butylamino)silane, vinyltri(isopropenoxy)silane, vinyltriacetoxysilane, vinyltris(trimethyl siloxy)silane, vinyldimethoxymethylaminosilane, methacryloxypropyltrimethoxysilane, methacryloxypropyltriethoxysilane, methacryloxypropylmethyldimethoxysilane, methacryloxypropylmethyldiethoxysilane, acryloxypropyltrimethoxysilane, 3-glycidoxypropyltrimethoxysilane, 2-(3,4-epoxycyclohexyl)ethyltrimethoxysilane, 3-aminopropyltrimethoxysilane, 3-mercaptopropyltrimethoxysilane, and 3-isocyanatopropyltrimethoxysilane.

Examples of unsaturated carboxylic acid anhydrides that can be used include maleic anhydride, citraconic anhydride, itaconic anhydride, 2,3-dimethylmaleic anhydride, 5-norbornene-2,3-dicarboxylic anhydride, allylsuccinic anhydride, 2-phenylmaleic anhydride, and cis-aconitic anhydride. Of these unsaturated carboxylic acid anhydrides, maleic anhydride, itaconic anhydride, and 5-norbornene-2,3-dicarboxylic anhydride are suitable from a viewpoint of ease of industrial acquisition. One of these unsaturated carboxylic acid anhydrides may be used individually, or two or more of these unsaturated carboxylic acid anhydrides may be used in combination.

Examples of glycidyl ethers that can be used include allyl glycidyl ether, benzyl glycidyl ether, 2-biphenyl glycidyl ether, 9,9-bis(4-glycidyloxy-3-methylphenyl)fluorene, 2,2-bis(4-glycidyloxyphenyl)propane, and 1,4-butanediol diglycidyl ether.

—Proportional Content of Adhesive Functional Group-Containing Compound—

The proportional content of the adhesive functional group-containing compound in the mixture that is kneaded in the heating and kneading step is preferably not less than 0.1 mass % and not more than 10 mass %, and more preferably not less than 0.1 mass % and not more than 5 mass %. When the proportional content of the adhesive functional group-containing compound is not less than the lower limit set forth above, adhesiveness of the obtained adhesive resin is sufficiently displayed. On the other hand, when the proportional content of the adhesive functional group-containing compound is not more than any of the upper limits set forth above, the presence of excess adhesive functional group-containing compound remaining in the adhesive resin can be prevented.

The proportion in which the adhesive functional group-containing compound is introduced into the adhesive resin obtained through the presently disclosed production method can be quantified by reprecipitating the adhesive resin after the cooling and kneading step, separating the precipitated adhesive resin from unreacted adhesive functional group-containing compound, and comparing the peak area ratio of the adhesive functional group-containing compound and the ring structure-containing hydrocarbon resin in the adhesive resin by FT-IR or the like. The peak area ratio increases or decreases depending on the additive amounts of the adhesive functional group-containing compound and the peroxide, the kneading temperature, and the kneading time, but eventually reaches a saturation value even when the additive amount of the adhesive functional group-containing compound continues to increase. The adhesive functional group-containing compound is not further introduced even when the adhesive functional group-containing compound is added in excess of this saturation value, and the excessive presence of adhesive functional groups causes self-cross-linking and the like, a large amount of gel formation, and foaming. In order that the adhesive functional group-containing compound is introduced in a preferable proportion, the peak area ratio of the ring structure-containing hydrocarbon resin relative to the saturation value for the peak area ratio of the adhesive functional group-containing compound is preferably 90% or less, and more preferably 70% or less.

[Peroxide]

The peroxide used in the presently disclosed production method is not specifically limited so long as it is a peroxide that dissociates upon heating to generate radicals. Examples of peroxides that can be used include di-tert-butyl peroxide, dicumyl peroxide, tert-butyl cumyl peroxide, benzoyl peroxide, dilauryl peroxide, cumene hydroperoxide, tert-butyl hydroperoxide, 1,1-bis(tert-butylperoxy)-3,5,5-trimethylcyclohexane, 2,5-dimethyl-2,5-di(tert-butylperoxy)hexane, 1,1-bis(tert-butylperoxy)-cyclohexane, cyclohexanone peroxide, tert-butyl peroxybenzoate, tert-butyl peroxyisobutyrate, tert-butyl peroxy-3,5,5-trimethylhexanoate, tert-butyl peroxy-2-ethylhexanoate, tert-butylperoxy isopropyl carbonate, and cumyl peroxyoctoate, with 2,5-dimethyl-2,5-di (tert-butylperoxy)hexane being preferable. One of these peroxides may be used individually, or two or more of these peroxides may be used in combination.

—Proportional Content of Peroxide—

The proportional content of the peroxide in the mixture that is kneaded in the heating and kneading step is preferably not less than 0.01 mass % and not more than 1.0 mass %, and more preferably not less than 0.05 mass % and not more than 0.5 mass %. When the proportional content of the peroxide is not less than any of the lower limits set forth above, the adhesive functional group-containing compound can be caused to suitably react with the ring structure-containing hydrocarbon resin, and an adhesive resin can be efficiently obtained. On the other hand, when the proportional content of the peroxide is not more than any of the upper limits set forth above, yellow discoloration of the obtained adhesive resin due to the presence of excess peroxide during kneading can be prevented.

[Preparation of Mixture]

The mixture used in the heating and kneading step can be prepared by mixing the ring structure-containing hydrocarbon resin, the adhesive functional group-containing compound, and the peroxide by a known method without any specific limitations. No specific limitations are placed on the order in which the components are mixed, and all of the components may be mixed at once, or some of the components may be mixed and then the remainder of the components may be subsequently added and mixed. One example of a particularly preferable order is an order in which the adhesive functional group-containing compound and the peroxide are sequentially mixed with the ring structure-containing hydrocarbon resin.

<<Details of Heating and Kneading Step>>

In the heating and kneading step, the mixture containing the ring structure-containing hydrocarbon resin, the adhesive functional group-containing compound, and the peroxide is kneaded while being heated to obtain a heated and kneaded product. By kneading the mixture while heating the mixture in this manner, the ring structure-containing hydrocarbon resin and the adhesive functional group-containing compound react through radicals of the peroxide to introduce an adhesive functional group of the adhesive functional group-containing compound into the ring structure-containing hydrocarbon resin, and the presence of residual peroxide in the resultant heated and kneaded product can be inhibited due to decomposition of the peroxide.

In the heating and kneading step, kneading is preferably performed until the content of the peroxide in the mixture is less than 1 ppm. By performing kneading until the content of the peroxide in the mixture is less than 1 ppm, the presence of residual peroxide in the obtained adhesive resin can be sufficiently inhibited.

Although no specific limitations are placed on the heating rate and the kneading time in the heating and kneading step, it is preferable that the heating and kneading step is performed by a kneading device in which the barrel temperature is preferably set to 200° C. or higher, more preferably 230° C. or higher, and even more preferably 250° C. or higher. By performing kneading with the barrel temperature set within any of the ranges set forth above, the mixture can be efficiently kneaded while being heated, and the peroxide in the mixture can be caused to sufficiently decompose. The kneading time is preferably 32 seconds or more, more preferably 64 seconds or more, and even more preferably 90 seconds or more, and is preferably 512 seconds or less, more preferably 256 seconds or less, and even more preferably 128 seconds or less. By setting the kneading time within any of the ranges set forth above, components in the mixture can be well kneaded.

The kneading device used in the heating and kneading step is not specifically limited and can be a heating mixer, a single screw kneading device, a twin screw kneading device, a multiscrew kneading device having three or more screws, a Banbury mixer, or the like. Of these kneading devices, a twin screw kneading device or a multiscrew kneading device having three or more screws is preferable from a viewpoint of maintaining air tightness and enabling efficient kneading.

<Cooling and Kneading Step>

The cooling and kneading step included in the presently disclosed method of producing an adhesive resin is performed in succession to the heating and kneading step and involves kneading the heated and kneaded product obtained in the heating and kneading step while cooling the heated and kneaded product to obtain a cooled and kneaded product.

<<Details of Cooling and Kneading Step>>

In the cooling and kneading step, kneading is preferably performed until the melt viscosity of the heated and kneaded product at a shear rate of not less than 1 mm/min and not more than 10 mm/min is preferably 20 Pa·s or more, more preferably 100 Pa·s or more, and even more preferably 500 Pa·s or more, and preferably 1,000 Pa·s or less. By kneading the heated and kneaded product while cooling the heated and kneaded product until the melt viscosity thereof is 20 Pa·s or more, handling of the resultant cooled and kneaded product is facilitated. Note that the melt viscosity of the heated and kneaded product can be measured using a Capilograph.

Although no specific limitations are placed on the cooling rate and the kneading time in the cooling and kneading step, the cooling and kneading step is preferably performed by a kneading device in which the barrel temperature is preferably set to 200° C. or lower, more preferably 180° C. or lower, and even more preferably 160° C. or lower. In a case in which the temperature is excessively lowered, the melt viscosity rises excessively and, in a situation in which the maximum load of a barrel drive motor of an extruding device is exceeded, this may lead to operation of the device stopping. Therefore, by performing kneading with a raised barrel temperature set within any of the ranges set forth above, cooling can be sufficiently performed to a degree that enables efficient pelletization of the heated and kneaded product. Although the kneading time is not specifically limited so long as sufficient cooling is performed, from a viewpoint of production efficiency with the heating and kneading step, the kneading time is preferably 16 seconds or more, more preferably 32 seconds or more, and even more preferably 60 seconds or more, and is preferably 256 seconds or less, more preferably 188 seconds or less, and even more preferably 126 seconds or less. By setting the kneading time within any of the ranges set forth above, components in the mixture can be well kneaded.

The kneading device used in the cooling and kneading step is not specifically limited and can be the same type of kneading device as for the kneading device used in the heating and kneading step. However, a single screw kneading device is preferable from a viewpoint that the influence of shear heat can be avoided and the heated and kneaded product can be efficiently cooled.

Moreover, the cooling and kneading step is preferably performed using a kneading device that is a separate device to the kneading device used in the heating and kneading step. In other words, it is preferable that the heating and kneading step is performed by a first kneading device and the cooling and kneading step is performed by a second kneading device.

Performing the heating and kneading step and the cooling and kneading step using different kneading devices makes it easy to make adjustments in each of the kneading steps and, as a result, enables efficient production of an adhesive resin. This also enables simplification of the overall production system by which the adhesive resin is produced.

The cooled and kneaded product obtained through the cooling and kneading step may be used in that form as an adhesive resin or may be used as an adhesive resin after optionally being subjected to post-processing through other steps described below.

According to the present disclosure, changes over time, such as decomposition and degradation, and gel formation in the obtained adhesive resin are inhibited through the presence of residual peroxide being inhibited, and pelletization of the adhesive resin can be efficiently performed. Moreover, the presently disclosed adhesive resin is not readily influenced by additives even in a situation in which additives are subsequently added to the adhesive resin, and thus reduction of the original performance of the adhesive resin and coloring of the adhesive resin due to the additives can be inhibited. Moreover, as a result of decomposition and degradation being inhibited, gel formation that can be problematic in terms of external appearance is inhibited, and transparency and mechanical strength of the adhesive resin are excellent. Note that the method of pelletization of the adhesive resin is not specifically limited and may be a known method.

<Other Steps>

Examples of other steps that can optionally be included in the presently disclosed method of producing an adhesive resin include an addition step, a pelletization step, and a lubrication step.

<<Addition Step>>

Any additives may be added to the obtained adhesive resin in an addition step that can be optionally included in the presently disclosed method of producing an adhesive resin.

[Additives]

No specific limitations are placed on the additives. For example, a low molecular weight resin that can be dispersed in the ring structure-containing hydrocarbon resin may be kneaded as an additive in order to adjust the softening temperature of the adhesive resin that is obtained through the presently disclosed production method. The softening temperature of the adhesive resin can be lowered by, for example, optionally adding polyisobutene, a petroleum resin, an oil, glycerin, or the like as an additive within a range that is not problematic in terms of adhesiveness and mechanical strength of the adhesive resin.

Moreover, since the presence of residual peroxide in the obtained adhesive resin is inhibited through the presently disclosed production method, an additive that displays reactivity with radicals generated through decomposition of the peroxide, such as an ultraviolet light inhibitor, a hindered amine light stabilizer (HALS) or other light stabilizer, an anti-aging agent, or the like, can also suitably be used. Furthermore, according to the present disclosure, an additive having an absorption band in a visible light region of 470 nm or less can suitably be used as an additive displaying radical reactivity, for example.

The additive amount of an additive that can be added to the adhesive resin is not specifically limited and varies depending on the solubility thereof in the adhesive resin and the required performance. However, from a viewpoint of cost and addition efficiency, the additive amount per 100 parts by mass of the adhesive resin is preferably 0.001 parts by mass or more, more preferably 0.01 parts by mass or more, and even more preferably 0.1 parts by mass or more, and is preferably 25 parts by mass or less, more preferably 10 parts by mass or less, and even more preferably 5 parts by mass or less. When the additive amount of an additive is not more than any of the upper limits set forth above, the original performance of the adhesive resin can be sufficiently displayed.

<<Pelletization Step>>

The obtained adhesive resin may be pelletized in a pelletization step that can be optionally included in the presently disclosed method of producing an adhesive resin. The pelletization can be performed using a known pelletizing device, for example. The known pelletizing device may be a pelletizing device in which a strand cutting method of cutting resin extruded as a strand to obtain bale-shaped pellets is adopted, a pelletizing device in which an underwater cutting method of cutting resin extruded from a die under water spraying to obtain spherical pellets is adopted, a pelletizing device in which an underwater cutting method of cutting extruded resin in water is adopted, or the like.

<<Lubrication Step>>

The surface of the adhesive resin that has been pelletized may be lubricated using an external lubricant, for example, in a lubrication step that can be optionally included in the presently disclosed method of producing an adhesive resin. An anti-blocking agent or the like can be used as the external lubricant, for example. The material of the anti-blocking agent may be inorganic particles such as talc or silica, stearic acid amide, a metallic soap, corn starch, or the like. One of these materials may be used individually, or two or more of these materials may be used together.

Although no specific limitations are placed on the used amount of the external lubricant, the amount per 100 parts by mass of the adhesive resin is preferably 0.0001 parts by mass or more, more preferably 0.0005 parts by mass or more, and even more preferably 0.001 parts by mass or more, and is preferably 0.5 parts by mass or less, more preferably 0.05 parts by mass or less, and even more preferably 0.01 parts by mass or less. When the used amount of the external lubricant relative to the adhesive resin is not less than any of the lower limits set forth above, the occurrence of bridging and blocking can be sufficiently inhibited during storage of the adhesive resin or during post-processing of the adhesive resin. On the other hand, when the used amount of the external lubricant relative to the adhesive resin is not more than any of the upper limits set forth above, sufficient transparency and adhesiveness of the adhesive resin can be maintained.

No specific limitations are placed on the timing at which the external lubricant is added to the adhesive resin. Accordingly, the adhesive resin may be cut by a known method such as underwater cutting or strand cutting, and the external lubricant may be added straight after dehydration of the adhesive resin. Moreover, the external lubricant may be mixed in advance with cooling water used in cutting of the adhesive resin into the form of pellets. Furthermore, the external lubricant may be added while performing mixing using a mixer or the like.

EXAMPLES

The following provides a more specific description of the present disclosure based on examples. However, the present disclosure is not limited to the following examples. In the following description, "%" and "parts" used in expressing quantities are by mass, unless otherwise specified.

In the examples and comparative examples, measurement or evaluation of pellet shape, observation of gels, introduction of an adhesive functional group, yellowness index, melt viscosity, and the amount of peroxide were carried out according to the following methods.

<Pellet Shape>

After collecting 50 g of pellets, these pellets were sorted using a mesh sieve having an opening size of 4 mm. The number of pellets for which a cutting error had occurred, such as two or three pellets that were connected without being cut and pellets connected in a caterpillar shape, was confirmed. An evaluation of "Pass" was given in a case in which not even one cutting error occurred in the 50 g of pellets and an evaluation of "Fail" was given in a case in which at least one cutting error had occurred.

Moreover, in the case of a kneaded product that could not be pelletized, a lump of the kneaded product was cooled using liquid nitrogen and was subsequently pulverized using a pulverizer (produced by Verder Scientific; model no.: Cutting Mill SM300) to prepare flakes that were then used in evaluation instead of pellets.

<Observation of Gels>

A small extruding device (produced by Technovel Corporation; model no.: KZW15TW-60MG-NM) in which a T-die had been installed was used to extrude and shape a final product under conditions of a barrel temperature of 210° C., a die temperature of 210° C., and a cooling roll temperature of 60° C. to obtain a sheet of 100 µm in thickness. The number of fish eyes and gels present in the obtained sheet was measured. Specifically, five test sheets each having a size of 10 cm×10 cm were prepared from the obtained sheet, and the number of visible fish eyes and gels having a diameter of 1 mm or more was measured for each of the sheets. An evaluation of "Pass" was given in a case in which the total number of fish eyes and gels present in the sheets was fewer than 5, and an evaluation of "Fail" was given in a case in which the total number was 5 or more.

<Introduction of Adhesive Functional Group>

In order to remove unreacted components, a final product was dissolved in toluene to prepare a 10% final product solution, the 10% final product solution was then added dropwise to acetone, precipitated solid content of the final product was collected, and the solid content was vacuum dried. Thereafter, an infrared spectrophotometer (produced by Thermo Fisher Scientific; model no.: iD5) was used to detect a peak attributed to an adhesive functional group with respect to the solid content of the final product that had been vacuum dried. In a case in which a peak was detected for the solid content of the final product, it was judged that an adhesive functional group had been introduced and an evaluation of "Pass" was given, whereas an evaluation of "Fail" was given in other cases.

<Yellowness Index (Yi)>

After adding 0.8 parts by mass of 2-(5-chloro-2-benzotriazolyl)-6-tert-butyl-p-cresol (TINUVIN 326 produced by BASF) to 100 parts by mass of a final product, these materials were dry blended and were subsequently melt-kneaded by a small extruding device (produced by Technovel Corporation; model no.: KZW15TW-60MG-NM) at a barrel temperature of 210° C. A kneaded resin obtained in this manner was loaded into an injection molding machine (produced by FANUC Corporation; model no.: ROBO SHOT S200i100A) and was used to produce a plate of 1 mm in thickness. The yellowness index (Yi) of the obtained plate was measured using a spectrophotometer (SE2000 produced by Nippon Denshoku Industries Co., Ltd.).

<Melt Viscosity>

A capillary rheometer (produced by CEAST; model no.: RHEOLOGIC 5000) was used to measure melt viscosity at a temperature of not lower than 190° C. and not higher than 270° C. and a shear rate of not less than 1 mm/min and not more than 10 mm/min for a kneaded product obtained through a cooling and kneading step. Note that in a case in which two kneading steps were performed using different kneading devices, the melt viscosity of a kneaded product obtained in the latter of the kneading steps was measured.

<Amount of Peroxide>

The following operations were performed to quantify a peroxide in a resin for a kneaded product obtained through a heating and kneading step. Specifically, in order to quantify the peroxide, 0.01 g of the peroxide that was used in kneading was weighed into a 10 mL volumetric flask, the peroxide was dissolved in acetonitrile to prepare a standard liquid concentrate, and the obtained standard liquid concentrate was diluted with acetonitrile to prepare calibration curve solutions. Next, 0.2 g of a measurement sample was weighed into a 25 mL volumetric flask, 2 mL of cyclohexane was added thereto, and the measurement sample was dissolved. After the measurement sample had dissolved, acetonitrile was gradually added to cause precipitation of a resin component and ultimately obtain 25 mL of a solution. The obtained solution of the precipitated resin was filtered by a PTFE filter to remove solid content and obtain a measurement solution. Measurement was performed by installing a column (produced by Imtakt Corporation; model no.: Cadenza CD-C18, 2.0×150 mm, 3 µm) in a liquid chromatography system (produced by Shimadzu Corporation; model no.: LC-20A) and by performing detection using a mass spectrometer (produced by SCIEX; model no.: API4000). The calibration curve solutions were used to prepare a calibration curve, and the amount of residual peroxide was quantified from detection results for the measurement solution.

<Weight-Average Molecular Weight and Molecular Weight Distribution of Copolymer>

Measurement was performed of values in terms of standard polystyrene by gel permeation chromatography (GPC) at 40° C. and a rate of 0.6 cc/min, and with tetrahydrofuran as an eluent. An HLC-8320 GPC produced by Tosoh Corporation was used as a measurement apparatus, three columns connected in series (TSKgel SuperH G5000HLX, G4000HLX, and G2000HLX) were used as a column, and measurement was performed after adjustment of the concentration to a polymer content of 4 mg/l cc.

Example 1

<Production System>

Figure 1:
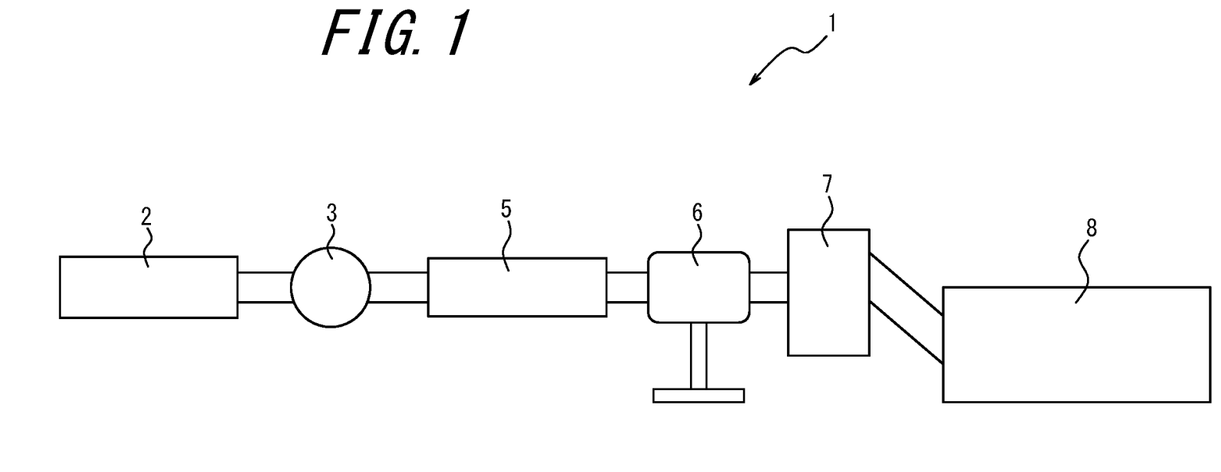
FIG. 1 illustrates a schematic configuration of a production system.

FIG. 1 illustrates the schematic configuration of a production system that was used. As illustrated in FIG. 1, the production system 1 includes a twin screw kneading device 2, a gear pump 3, a single screw kneading device 5, an underwater cutter/pelletizing device 6, a centrifugal dehydrator 7, and a ribbon mixer 8 from upstream to downstream.

The twin screw kneading device 2 includes a metering hopper (not illustrated) and an injection part (not illustrated). The twin screw kneading device 2 and the single screw kneading device 5 are joined via the gear pump 3. The underwater cutter/pelletizing device 6 is disposed at an outlet side of the single screw kneading device 5. The centrifugal dehydrator 7 is disposed at an outlet side of the underwater cutter/pelletizing device 6. The ribbon mixer 8 is disposed at an outlet side of the centrifugal dehydrator 7. The ribbon mixer 8 is connected to an external lubricant supply device (not illustrated) and a tank (not illustrated) that collects the product resin after a lubrication operation.

Details of each of these devices are as follows.

Twin screw kneading device 2: Produced by Toshiba Machine Co., Ltd.; model no. TEM-37

Gear pump 3: Produced by Nordson Xaloy Inc.; model no. MJ-1143

Single screw kneading device 5: Produced by IKG Corporation; model no. PMS30-28

Underwater cutter/pelletizing device 6: Produced by ECON GmbH

Centrifugal dehydrator 7: Produced by ECON GmbH; model no. EUP10

Ribbon mixer 8: Produced by Makino Mfg. Co., Ltd.; model no. RMM100

[Materials]

The following materials were used in Example 1.

Ring structure-containing hydrocarbon resin: Hydrogenated styrene-isoprene-styrene block copolymer Adhesive functional group-containing compound: Vinylmethoxysilane (KBM-1003 produced by Shin-Etsu Chemical Co., Ltd.)

Peroxide: 2,5-Dimethyl-2,5-di(tert-butylperoxy)hexane (PERHEXA® 25B (PERHEXA is a registered trademark in Japan, other countries, or both) produced by NOF Corporation)

External lubricant: Ethylene bis(stearamide) (KAO WAX EB-FF produced by Kao Corporation)

Note that the hydrogenated styrene-isoprene-styrene block copolymer was produced as described below.

—Production of Hydrogenated Styrene-Isoprene-Styrene Block Copolymer—

~Production of Styrene-Isoprene-Styrene Block Copolymer~

A reactor that included a stirrer and had been sufficiently internally purged with nitrogen was charged with 300 parts of dehydrated cyclohexane and 0.475 parts of diethyl ether. Thereafter, the contents of the reactor were stirred at 60° C. while 0.91 parts of n-butyllithium (15% cyclohexane solution) was added thereto. Stirring of the contents of the reactor was continued at 60° C. while 25 parts of dehydrated styrene was added continuously into the reactor over 70 minutes and a polymerization reaction was allowed to progress, and the contents were stirred in the same manner for a further 20 minutes at 60° C. once this addition had been completed. The polymerization conversion rate at this point as determined through gas chromatography (GC) measurement of the reaction liquid was 99.5%.

Next, 50 parts of dehydrated isoprene was continuously added to the reaction liquid over 130 minutes, and stirring was continued in the same manner for 30 minutes once this addition had been completed. The polymerization conversion rate at this point as determined through GC analysis of the reaction liquid was 99.5%.

Thereafter, 25 parts of dehydrated styrene was continuously added to the reaction liquid over 70 minutes, and stirring was continued in the same manner for 60 minutes once this addition had been completed. The polymerization conversion rate at this point as determined through GC analysis of the reaction liquid was almost 100%.

The reaction was terminated through addition of 1.0 parts of isopropyl alcohol to the reaction liquid to yield a polymer solution. The block copolymer contained in the polymer solution was a styrene-isoprene-styrene block copolymer in which polymer blocks [A] formed of styrene monomer units and a polymer block [B] formed of isoprene monomer units were arranged in an order of A-B-A. The mass ratio (wA:wB) of the content of the polymer blocks [A] and the content of the polymer block [B] in the styrene-isoprene-styrene block copolymer was 50/50.

~Hydrogenation of Styrene-Isoprene-Styrene Block Copolymer~

Next, the polymer solution was transferred to a pressure-resistant reactor including a stirrer, and then 4.0 parts of a nickel catalyst supported on diatomaceous earth carrier (E22U produced by JGC Catalysts and Chemicals Ltd.; amount of supported nickel: 60%) as a hydrogenation catalyst and 100 parts of dehydrated cyclohexane were added and mixed therewith. The inside of the reactor was purged with hydrogen gas, and then the solution was stirred while further supplying hydrogen into the reactor and carrying out a hydrogen reaction for 6 hours at a temperature of 190° C. and a pressure of 4.5 MPa.

Once the hydrogenation reaction was completed, the reaction solution was filtered to remove the hydrogenation catalyst, and then 2.0 parts by mass of a xylene solution in which 0.1 parts of pentaerythritol tetrakis[3-(3,5-di-t-butyl-4-hydroxyphenyl)propionate] (A060 produced by Adeka Corporation) had been dissolved as a phenolic antioxidant was added to the resultant solution and was dissolved.

Next, cyclohexane, xylene, and other volatile components were removed from the solution at a temperature of 260° C. and a pressure of 0.001 MPa using a cylindrical evaporator (Kontro produced by Hitachi, Ltd.). Molten polymer was extruded in the form of a strand from a die, was cooled, and was subsequently cut by a pelletizer to obtain 94 parts of a hydrogenated styrene-isoprene-styrene block copolymer having a pellet form.

The percentage hydrogenation of the obtained hydrogenated styrene-isoprene-styrene block copolymer was almost 100% for both "main chains and side chains" and for "aromatic rings". The weight-average molecular weight (Mw) was 48,000 and the molecular weight distribution (Mw/Mn) was 1.4.

<Operating Procedure>

The operating procedure in Example 1 is described below with reference to FIG. 1.

The hydrogenated styrene-isoprene-styrene block copolymer was loaded into the metering hopper (not illustrated) of the twin screw kneading device 2 as a ring structure-containing hydrocarbon resin, and then this hydrogenated styrene-isoprene-styrene block copolymer was supplied into the twin screw kneading device 2 at 10 kg/hr with the twin screw kneading device 2 set to a barrel temperature of 250° C. and a rotation speed of 150 rpm. A liquid addition pump capable of metering was used to inject 2.0 parts of vinylmethoxysilane as an adhesive functional group-containing compound and 0.1 parts of 2,5-dimethyl-2,5-di(tert-butylperoxy)hexane as a peroxide via the injection part (not illustrated) with respect to 100 parts of the hydrogenated styrene-isoprene-styrene block copolymer. A mixture of the hydrogenated styrene-isoprene-styrene block copolymer, vinylmethoxysilane, and 2,5-dimethyl-2,5-di(tert-butylperoxy)hexane was kneaded for 90 seconds while being heated using the twin screw kneading device 2 to obtain a kneaded product (heating and kneading step).

Next, the obtained kneaded product was transported to the single screw kneading device 5 using the gear pump 3.

Thereafter, the kneaded product was kneaded for a further 60 seconds using the single screw kneading device 5 to obtain a kneaded product with the single screw kneading device 5 set to a barrel temperature of 160° C. and a rotation speed of 100 rpm (cooling and kneading step). The obtained kneaded product was cut by the underwater cutter/pelletizing device 6 and was dehydrated by the centrifugal dehydrator 7, and then the kneaded product that had been cut was transported to the ribbon mixer 8. Next, 0.005 parts of ethylene bis(stearamide) (KAO WAX EB-FF produced by Kao Corporation) as an external lubricant A was added to 100 parts of the kneaded product that had been cut, and these materials were mixed using the ribbon mixer 8 to obtain a final product. Various evaluations were performed with respect to the obtained final product. The results are shown in Table 1.

Example 2

A final product was obtained in the same way as in Example 1 with the exception that an external lubricant B (saturated fatty acid amide (SLIPACKS® E SA-20 (SLIPACKS is a registered trademark in Japan, other countries, or both) produced by Nippon Kasei Chemical Co., Ltd.) diluted by a factor of 10 with deionized water) was used instead of the external lubricant A, and the external lubricant B was added dropwise into the ribbon mixer 8. Various evaluations were performed in the same way as in Example 1 with respect to the obtained final product. The results are shown in Table 1.

Example 3

A final product was obtained in the same way as in Example 1 with the exception that the amount of the peroxide was changed to 0.2 parts. Various evaluations were performed in the same way as in Example 1 with respect to the obtained final product. The results are shown in Table 1.

Example 4

A final product was obtained in the same way as in Example 1 with the exception that 17.5 parts of polyisobutene (10SH produced by NOF Corporation) that had been heated to 40° C. was injected into the single screw kneading device 5 as a softening temperature modifier. Various evaluations were performed in the same way as in Example 1 with respect to the obtained final product. The results are shown in Table 1.

Example 5

A final product was obtained in the same way as in Example 1 with the exception that an acrylic silane (KBM-5103 produced by Shin-Etsu Chemical Co., Ltd.) was used instead of vinylmethoxysilane as an adhesive functional group-containing compound. Various evaluations were performed in the same way as in Example 1 with respect to the obtained final product. The results are shown in Table 1.

Example 6

A final product was obtained in the same way as in Example 1 with the exception that maleic anhydride (produced by Tokyo Chemical Industry Co., Ltd.; product name: Maleic anhydride) was used instead of vinylmethoxysilane as an adhesive functional group-containing compound. Various evaluations were performed in the same way as in Example 1 with respect to the obtained final product. The results are shown in Table 1.

Example 7

A final product was obtained in the same way as in Example 1 with the exception that an acrylic glycidyl ether (produced by Tokyo Chemical Industry Co., Ltd.; product name: Glycidyl methacrylate) was used instead of vinylmethoxysilane as an adhesive functional group-containing compound. Various evaluations were performed in the same way as in Example 1 with respect to the obtained final product. The results are shown in Table 1.

Note that for the final products obtained in Examples 1 to 7, the peak area ratio of the ring structure-containing hydrocarbon resin was 70% or less relative to a saturation value for the peak area ratio of the adhesive functional group-containing compound.

Comparative Example 1

<Production System>

Figure 2:
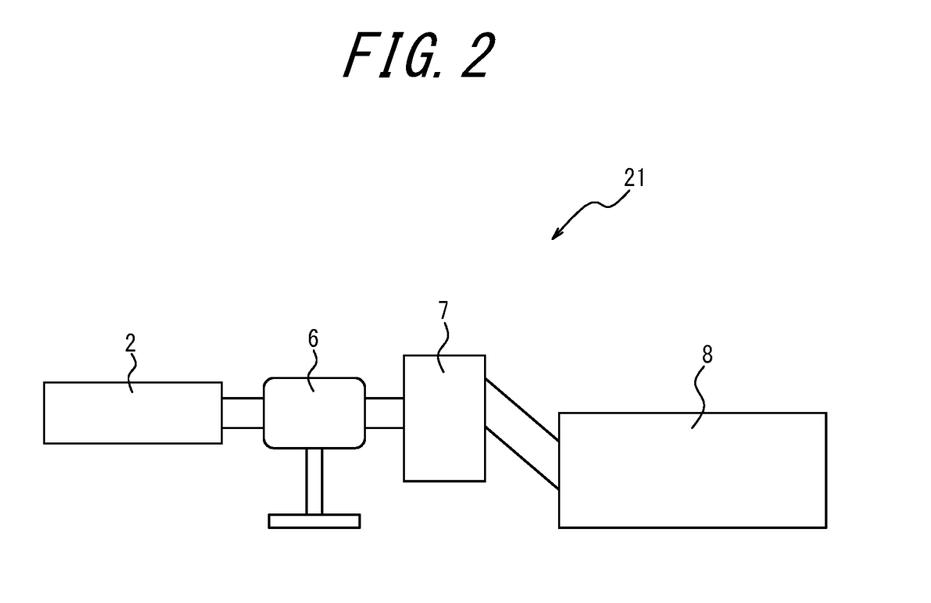
FIG. 2 illustrates another schematic configuration of a production system.

FIG. 2 illustrates the schematic configuration of a production system that was used in Comparative Example 1. As illustrated in FIG. 2, the production system 21 includes a twin screw kneading device 2, an underwater cutter/pelletizing device 6, a centrifugal dehydrator 7, and a ribbon mixer 8. Note that in FIG. 2, devices that are the same as in the production system 1 illustrated in FIG. 1 are marked by the same reference signs as in FIG. 1. As illustrated in FIG. 2, the production system 21 is the same as the production system 1 with the exception that the underwater cutter/pelletizing device 6 is connected to the outlet side of the twin screw kneading device 2 such as to omit the gear pump 3 and the single screw kneading device 5 illustrated in FIG. 1. Therefore, description of the various devices is omitted.

[Materials]

The same materials as in Example 1 were used in Comparative Example 1.

<Operating Procedure>

The operating procedure in Comparative Example 1 is described below with reference to FIG. 2.

The hydrogenated styrene-isoprene-styrene block copolymer was loaded into the metering hopper (not illustrated) of the twin screw kneading device 2 as a ring structure-containing hydrocarbon resin, and then this hydrogenated styrene-isoprene-styrene block copolymer was supplied into the twin screw kneading device 2 at 10 kg/hr with the twin screw kneading device 2 set to a barrel temperature of 260° C. and a rotation speed of 150 rpm. A liquid addition pump capable of metering was used to inject 2.0 parts of vinylmethoxysilane as an adhesive functional group-containing compound and 0.1 parts of 2,5-dimethyl-2,5-di(tert-butylperoxy)hexane as a peroxide via the injection part (not illustrated) with respect to 100 parts of the hydrogenated styrene-isoprene-styrene block copolymer. A mixture of the hydrogenated styrene-isoprene-styrene block copolymer, vinylmethoxysilane, and 2,5-dimethyl-2,5-di(tert-butylperoxy)hexane was kneaded for 90 seconds while being heated using the twin screw kneading device 2 to obtain a kneaded product (heating and kneading step).

Next, the obtained kneaded product was cut by the underwater cutter/pelletizing device 6 and dehydrated by the centrifugal dehydrator 7, and then the kneaded product that had been cut was transported to the ribbon mixer 8. Next, 0.005 parts of ethylene bis(stearamide) as an external lubricant A was added to 100 parts of the kneaded product that had been cut, and these materials were mixed using the ribbon mixer 8 to obtain a final product. Various evaluations were performed in the same way as in Example 1 with respect to the obtained final product. The results are shown in Table 1.

Comparative Example 2

The same production system 1 (refer to FIG. 1) as in Example 1 was used in Comparative Example 2. A final product was obtained in the same way as in Example 1 with the exception that the barrel temperature of the single screw kneading device 5 was changed to 260° C. such that a cooling and kneading step was not performed. Various evaluations were performed in the same way as in Example 1 with respect to the obtained final product. The results are shown in Table 1.

Comparative Example 3

The same production system 1 (refer to FIG. 1) as in Example 1 was used in Comparative Example 3. A final product was obtained in the same way as in Example 1 with the exception that the barrel temperature of the twin screw kneading device 2 was changed to 160° C. Various evaluations were performed in the same way as in Example 1 with respect to the obtained final product. The results are shown in Table 1.

In Table 1, shown below:

"SIS" indicates hydrogenated styrene-isoprene-styrene block copolymer;

"PH" indicates 2,5-dimethyl-2,5-di(tert-butylperoxy)hexane;

"EB-FF" indicates ethylene bis(stearamide);

"SA-20" indicates saturated fatty acid amide; and

"10SH" indicates polyisobutene.

TABLE 1

| | | Example 1 | Example 2 | Example 3 | Example 4 | Example 5 |
|---|---|---|---|---|---|---|
| Ring structure-containing hydrocarbon resin | Type | SIS | SIS | SIS | SIS | SIS |
| | Additive amount (parts by mass) | 100 | 100 | 100 | 100 | 100 |
| Adhesive functional group-containing compound | Type | Vinylmethoxy silane | Vinylmethoxy silane | Vinylmethoxy silane | Vinylmethoxy silane | Acrylic silane |
| | Additive amount (parts by mass) | 2.0 | 2.0 | 2.0 | 2.0 | 2.0 |
| Peroxide | Type | PH | PH | PH | PH | PH |
| | Additive amount (parts by mass) | 0.1 | 0.1 | 0.2 | 0.1 | 0.1 |
| External lubricant | Type | EB-FF | SA-20 | EB-FF | EB-FF | EB-FF |
| | Additive amount (parts by mass) | 0.005 | 0.005 | 0.005 | 0.005 | 0.005 |
| Softening temperature modifier | Type | — | — | — | 10SH | — |
| | Additive amount (parts by mass) | — | — | — | 17.5 | — |
| Barrel temperature of twin screw kneading device | | 230° C. | 230° C. | 230° C. | 230° C. | 230° C. |
| Barrel temperature of single screw extruding device | | 160° C. | 160° C. | 160° C. | 160° C. | 160° C. |
| Evaluation | Pellet shape | Pass | Pass | Pass | Pass | Pass |
| | Observation of gels | Pass | Pass | Pass | Pass | Pass |
| | Introduction of adhesive functional group | Pass | Pass | Pass | Pass | Pass |
| | Yellowness index | 2.8 | 2.8 | 2.8 | 2.8 | 2.8 |
| | Melt viscosity (Pa · s) | $5.8 \times 10^2$ | $5.8 \times 10^2$ | $12.2 \times 10^2$ | $5.8 \times 10^2$ | $5.8 \times 10^2$ |
| | Amount of peroxide (ppm) | 0.1 | 0.1 | 0.3 | 0.1 | 0.1 |

| | | Example 6 | Example 7 | Comparative Example 1 | Comparative Example 2 | Comparative Example 3 |
|---|---|---|---|---|---|---|
| Ring structure-containing hydrocarbon resin | Type | SIS | SIS | SIS | SIS | SIS |
| | Additive amount (parts by mass) | 100 | 100 | 100 | 100 | 100 |

TABLE 1-continued

| | | | | | | |
|---|---|---|---|---|---|---|
| Adhesive functional group-containing compound | Type | Maleic anhydride | Acrylic glycidyl ether | Vinylmethoxy silane | Vinylmethoxy silane | Vinylmethoxy silane |
| | Additive amount (parts by mass) | 2.0 | 2.0 | 2.0 | 2.0 | 2.0 |
| Peroxide | Type | PH | PH | PH | PH | PH |
| | Additive amount (parts by mass) | 0.1 | 0.1 | 0.1 | 0.1 | 0.1 |
| External lubricant | Type | EB-FF | EB-FF | EB-FF | EB-FF | EB-FF |
| | Additive amount (parts by mass) | 0.005 | 0.005 | 0.005 | 0.005 | 0.005 |
| Softening temperature modifier | Type | — | — | — | — | — |
| | Additive amount (parts by mass) | — | — | — | — | — |
| Barrel temperature of twin screw kneading device | | 230° C. | 230° C. | 260° C. | 230° C. | 160° C. |
| Barrel temperature of single screw extruding device | | 160° C. | 160° C. | — | 260° C. | 160° C. |
| Evaluation | Pellet shape | Pass | Pass | Fail | Fail | Pass |
| | Observation of gels | Pass | Pass | Fail | Pass | Pass |
| | Introduction of adhesive functional group | Pass | Pass | Fail | Pass | Pass |
| | Yellowness index | 2.8 | 2.8 | 2.8 | 2.8 | 3.8 |
| | Melt viscosity (Pa·s) | $5.8 \times 10^2$ | $5.8 \times 10^2$ | $10.8 \times 10^0$ | $10.8 \times 10^0$ | $3.2 \times 10^2$ |
| | Amount of peroxide (ppm) | 0.1 | 0.1 | 0.1 | 0.1 | 30 |

It can be seen from Examples 1 to 7 in Table 1 that by adopting a production method including both a heating and kneading step and a cooling and kneading step, pellets in which gel formation does not occur, in which an adhesive functional group is well introduced, that have a low yellowness index, and in which the amount of peroxide is small are obtained as a final product.

On the other hand, it can be seen from Comparative Example 1 that when only a heating and kneading step is included, not only can the final product not be obtained as pellets, but gel formation occurs in the final product, and an adhesive functional group is not introduced into the final product.

Moreover, it can be seen from Comparative Example 2 that when kneading is performed under further heating without performing a cooling and kneading step after a heating and kneading step, although gel formation does not occur in the final product and an adhesive functional group is introduced, the final product cannot be obtained as pellets.

Furthermore, it can be seen from Comparative Example 3 that even when kneading is performed using a single screw kneading device and a twin screw kneading device that are different kneading devices, the yellowness index of the obtained final product increases in a case in which the kneading temperature is not raised and lowered.

INDUSTRIAL APPLICABILITY

Through the presently disclosed production method, it is possible to provide an adhesive resin that can be efficiently pelletized while also inhibiting changes over time, such as decomposition and degradation, and gel formation in the adhesive resin.

REFERENCE SIGNS LIST

1, 21 production system
2 twin screw kneading device
3 gear pump
5 single screw kneading device
6 underwater cutter/pelletizing device
7 centrifugal dehydrator
8 ribbon mixer

The invention claimed is:

1. A method of producing an adhesive resin comprising:
a heating and kneading step of kneading a mixture containing a ring structure-containing hydrocarbon resin, an adhesive functional group-containing compound, and a peroxide while heating the mixture to obtain a heated and kneaded product; and
a cooling and kneading step, performed in succession to the heating and kneading step, of kneading the heated and kneaded product while cooling the heated and kneaded product to obtain a cooled and kneaded product, wherein
the adhesive resin has a yellowness index (Yi) of 3.0 or less when 0.8 parts by mass of 2-(5-chloro-2-benzotriazolyl)-6-tert-butyl-p-cresol is added to 100 parts by mass of the adhesive resin.

2. The method of producing an adhesive resin according to claim 1, wherein the heating and kneading step is performed by a first kneading device and the cooling and kneading step is performed by a second kneading device.

3. The method of producing an adhesive resin according to claim 1, wherein kneading is performed until content of the peroxide in the mixture is less than 1 ppm in the heating and kneading step.

4. The method of producing an adhesive resin according to claim 1, wherein kneading is performed until melt viscosity of the heated and kneaded product at a shear rate of not less than 1 mm/min and not more than 10 mm/min is 20 Pa·s or more in the cooling and kneading step.

5. The method of producing an adhesive resin according to claim 1, wherein the ring structure-containing hydrocarbon resin is a hydrogenated block copolymer [D] obtained through hydrogenation of a block copolymer [C] including at least two polymer blocks [A] having a structural unit derived from an aromatic vinyl compound as a main component and at least one polymer block [B] having a structural unit derived from a conjugated diene compound as a main component.

6. The method of producing an adhesive resin according to claim 5, wherein the hydrogenated block copolymer [D] is a product in which 90% or more of aromatic ring carbon-carbon unsaturated bonds in the block copolymer [C] that are derived from the aromatic vinyl compound and main chain and side chain carbon-carbon unsaturated bonds in the block copolymer [C] that are derived from the conjugated diene compound have been hydrogenated.

7. The method of producing an adhesive resin according to claim 1, wherein the adhesive functional group-containing compound is at least one selected from the group consisting of a silane coupling agent, an unsaturated carboxylic acid anhydride, and a glycidyl ether.

* * * * *